US011221905B2

(12) United States Patent
Venkatesan et al.

(10) Patent No.: US 11,221,905 B2
(45) Date of Patent: Jan. 11, 2022

(54) SYSTEM TO MONITOR COMPUTING HARDWARE IN A COMPUTING INFRASTRUCTURE FACILITY

(71) Applicant: International Business Machines Corporation, Armonk, NY (US)

(72) Inventors: Vidhya Shankar Venkatesan, Bangalore (IN); Anand Haridass, Bangalore (IN); Diyanesh B. Chinnakkonda Vidyapoornachary, Bangalore (IN); Arun Joseph, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 478 days.

(21) Appl. No.: 15/982,462

(22) Filed: May 17, 2018

(65) Prior Publication Data

US 2019/0354420 A1  Nov. 21, 2019

(51) Int. Cl.
| | |
|---|---|
| *G06F 11/00* | (2006.01) |
| *G06F 11/07* | (2006.01) |
| *G06F 11/30* | (2006.01) |
| *H04N 7/18* | (2006.01) |
| *G06F 11/32* | (2006.01) |
| *G06N 20/00* | (2019.01) |

(52) U.S. Cl.
CPC ........ *G06F 11/079* (2013.01); *G06F 11/3058* (2013.01); *G06F 11/325* (2013.01); *H04N 7/181* (2013.01); *G06N 20/00* (2019.01)

(58) Field of Classification Search
CPC ............. G06F 11/3058; G06F 11/0709; G06F 11/079; G06F 11/325; H04N 7/181
See application file for complete search history.

(56) References Cited

U.S. PATENT DOCUMENTS

| | | | | |
|---|---|---|---|---|
| 6,225,609 | B1* | 5/2001 | Imanari | B21B 37/76 164/154.6 |
| 6,280,317 | B1* | 8/2001 | Przilas | H05K 7/207 361/695 |
| 6,535,382 | B2* | 3/2003 | Bishop | H05K 7/20736 312/223.1 |
| 6,639,794 | B2* | 10/2003 | Olarig | H05K 7/20581 174/15.2 |
| 9,064,216 | B2 | 6/2015 | Reddy et al. | |
| 9,557,807 | B2 | 1/2017 | Mick et al. | |
| 10,229,026 | B1* | 3/2019 | Vijendra | G06F 11/3058 |

(Continued)

OTHER PUBLICATIONS

Google Scholar/Patents—text refined (Year: 2021).*
Google Scholar/Patents—"monitoring infrastructure environmental tracking root cause"—text refined (Year: 2021).*

*Primary Examiner* — Christopher S McCarthy
(74) *Attorney, Agent, or Firm* — Patterson + Sheridan, LLP

(57) ABSTRACT

Embodiments relate to monitoring computing hardware in a computing infrastructure facility. Image data and environmental data are received and a current operational status for a computing hardware component is determined from the image data. A hardware operational status tracking model and environment tracking model for the computing hardware component are updated. Embodiments can perform a root cause analysis if the current operational status is a fault status to determine if the fault status was caused by environmental conditions.

20 Claims, 10 Drawing Sheets

(56) References Cited

U.S. PATENT DOCUMENTS

| | | | |
|---|---|---|---|
| 10,516,981 B1* | 12/2019 | Lingle | H04L 67/28 |
| 2002/0138782 A1* | 9/2002 | Durrant | G06F 11/0727 |
| | | | 714/2 |
| 2004/0150519 A1* | 8/2004 | Husain | G08B 13/19656 |
| | | | 340/506 |
| 2004/0262409 A1* | 12/2004 | Crippen | G05B 23/0235 |
| | | | 236/49.3 |
| 2006/0129277 A1* | 6/2006 | Wu | G06F 3/015 |
| | | | 700/245 |
| 2008/0310967 A1* | 12/2008 | Franz | G06F 1/20 |
| | | | 417/32 |
| 2012/0304008 A1* | 11/2012 | Hackstein | G05B 23/0229 |
| | | | 714/26 |
| 2015/0338281 A1* | 11/2015 | Ross | G01K 3/14 |
| | | | 236/44 A |
| 2016/0072891 A1* | 3/2016 | Joshi | G06Q 30/0631 |
| | | | 370/254 |
| 2016/0277248 A1 | 9/2016 | Barajas Gonzalez et al. | |
| 2017/0258390 A1* | 9/2017 | Howard | A61B 5/4836 |
| 2017/0286838 A1* | 10/2017 | Cipriani | G06N 20/00 |
| 2017/0331709 A1* | 11/2017 | Lam | H04L 41/0213 |
| 2017/0350403 A1* | 12/2017 | Kelly | F04D 29/582 |
| 2018/0150344 A1* | 5/2018 | Kim | G06F 11/0709 |
| 2018/0159756 A1* | 6/2018 | Matthews | H04L 41/0873 |
| 2018/0284735 A1* | 10/2018 | Cella | G05B 13/028 |
| 2018/0373300 A1* | 12/2018 | Bhatia | G06F 1/206 |
| 2019/0138423 A1* | 5/2019 | Agerstam | G06F 11/3447 |
| 2019/0163551 A1* | 5/2019 | Cheriton | G06F 11/3006 |
| 2019/0340552 A1* | 11/2019 | Demetriou | G06T 1/0014 |
| 2020/0026585 A1* | 1/2020 | Grundy | G08B 29/04 |
| 2020/0068368 A1* | 2/2020 | Kruse | H04L 12/2803 |

* cited by examiner

| OPERATIONAL STATUS | 302 | 304 | 306 | 308 | 310 | 312 | 314 |
|---|---|---|---|---|---|---|---|
| ALL SYSTEM/SUBSYSTEM FUNCTIONS ARE GOOD (NO FAULTS) — 322 | G | G | G | G | G | G | G |
| PROCESSOR SUBSYSTEM HAS A MAJOR FAULT AND NEEDS SERVICE/REPLACEMENT — 324 | G | G | G | G | G | G | R |
| MEMORY SUBSYSTEM HAS A MAJOR FAULT AND NEEDS SERVICE/REPLACEMENT — 326 | G | G | G | G | G | R | G |
| COOLING SUBSYSTEM HAS A MAJOR FAULT AND NEEDS SERVICE/REPLACEMENT — 328 | G | G | G | G | R | G | G |
| IO SUBSYSTEM HAS A MAJOR FAULT AND NEEDS SERVICE/REPLACEMENT — 330 | G | G | G | R | G | G | G |
| STORAGE SUBSYSTEM HAS A MAJOR FAULT AND NEEDS SERVICE/REPLACEMENT — 332 | G | G | R | G | G | G | G |
| POWER SUPPLY SUBSYSTEM HAS A MAJOR FAULT AND NEEDS SERVICE/REPLACEMENT — 334 | G | R | G | G | G | G | G |
| SERVICE COMPONENT HAS A MAJOR FAULT AND NEEDS SERVICE/REPLACEMENT — 336 | R | G | G | G | G | G | G |

*Fig. 3A*

| | 302 | 304 | 306 | 308 | 310 | 312 | 314 |
|---|---|---|---|---|---|---|---|
| OPERATIONAL STATUS | | | | | | | |
| ALL SYSTEM/SUBSYSTEM FUNCTIONS ARE GOOD (NO FAULTS) — 352 | G | G | G | G | G | G | G |
| PROCESSOR SUBSYSTEM HAS PARTIAL FAILURE AND OPERATES IN DEGRADED MODE — 354 | G | G | G | G | G | G | B |
| MEMORY SUBSYSTEM HAS PARTIAL FAILURE AND OPERATES IN DEGRADED MODE — 356 | G | G | G | G | G | B | G |
| COOLING SUBSYSTEM HAS PARTIAL FAILURE AND OPERATES IN DEGRADED MODE — 358 | G | G | G | G | B | G | G |
| IO SUBSYSTEM HAS PARTIAL FAILURE AND OPERATES IN DEGRADED MODE — 360 | G | G | G | B | G | G | G |
| STORAGE SUBSYSTEM HAS PARTIAL FAILURE AND OPERATES IN DEGRADED MODE — 362 | G | G | B | G | G | G | G |
| POWER SUPPLY SUBSYSTEM HAS PARTIAL FAILURE AND OPERATES IN DEGRADED MODE — 364 | G | B | G | G | G | G | G |
| SERVICE COMPONENT HAS PARTIAL FAILURE AND OPERATES IN DEGRADED MODE — 366 | B | G | G | G | G | G | G |

Fig. 3B

SYSTEM TO MONITOR COMPUTING HARDWARE IN A COMPUTING INFRASTRUCTURE FACILITY

BACKGROUND

The present invention relates to monitoring operational conditions of computing infrastructure facilities, and more specifically, to noninvasively monitoring computing hardware for fault conditions.

In current computing infrastructure facilities, such as colocation data centers, the managers, owners, and/or providers of the facility provide the facility (e.g., building space) to house computing hardware. Failure of various computing hardware housed in the computing infrastructure facility is known to occur due to various reasons including data center facilities environmental factors such as temperature, humidity, and contamination apart from other reasons related to wear and tear. The providers of the facility need the ability to determine whether the cause of a failure is environmental or due to hardware wear and tear. In current computing infrastructure facilities, a management console must be used to access the information related to hardware failures the various computing hardware. To ensure privacy and security of the computing hardware and the data created, transmitted, and/or stored on the computing hardware the facility providers may not have direct access to the computing hardware to determine the cause of hardware failures. In addition, the heterogeneous nature of the equipment used in computing infrastructure facilities, including different types of computing hardware (servers, networking, storage, etc.) and different computing hardware manufacturers complicates facility providers' effective monitoring of the computing hardware.

SUMMARY

According to one embodiment of the present disclosure, a method for monitoring computing hardware in a computing infrastructure facility includes receiving image data captured using one or more camera devices and representing output of one or more displays for a one or more computing hardware components, receiving, from one or more sensors, environmental data representing environmental conditions of the computing infrastructure facility, updating a hardware operational status tracking model for the computing hardware component with the current operational status and an environment tracking model for the computing infrastructure facility with the environmental conditions, and when the current operational status for a computing hardware component comprises a fault status, performing a root cause analysis for the fault status to determine if the fault status is an environmental fault status by processing the hardware operational status tracking model and the environment tracking model through a machine learning model.

According to another embodiment of the present disclosure, a system for monitoring computing hardware in a computing infrastructure facility, the system comprising: one or more computer processors, one or more sensors, and a memory containing a program which when executed by the processors performs an operation. The operation includes receiving, from one or more sensors, image data comprising one or more displays for a one or more computing hardware components, determining, from the received image data, a current operational status for a computing hardware component of the one or more computing hardware components, receiving, from one or more sensors, environmental data representing environmental conditions of the computing infrastructure facility, updating a hardware operational status tracking model for the computing hardware component with the current operational status and an environment tracking model for the computing infrastructure facility with the environmental conditions, and when the current operational status for a computing hardware component comprises a fault status, performing a root cause analysis for the fault status to determine if the fault status is an environmental fault status by processing the hardware operational status tracking model and the environment tracking model through a machine learning model.

According to another embodiment of the present disclosure, a computer program product for monitoring computing hardware in a computing infrastructure facility, the computer program product includes a computer-readable storage medium having computer-readable program code embodied therewith, the computer-readable program code executable by one or more computer processors to perform an operation that includes: receiving image data captured using one or more camera devices and representing output of one or more displays for a one or more computing hardware components, determining, from the received image data, a current operational status for a computing hardware component of the one or more computing hardware components, receiving, from one or more sensors, environmental data representing environmental conditions of the computing infrastructure facility, updating a hardware operational status tracking model for the computing hardware component with the current operational status and an environment tracking model for the computing infrastructure facility with the environmental conditions, and when the current operational status for a computing hardware component comprises a fault status, performing a root cause analysis for the fault status to determine if the fault status is an environmental fault status by processing the hardware operational status tracking model and the environment tracking model through a machine learning model.

BRIEF DESCRIPTION OF THE SEVERAL VIEWS OF THE DRAWINGS

FIG. 3A illustrates hardware status panels with fault conditions, according to one embodiment.

FIG. 3B illustrates hardware status panels with partial fault conditions, according to one embodiment.

DETAILED DESCRIPTION

Embodiments described herein provide a manner in which the provider of a computing infrastructure facility can non-invasively monitor the functioning of the computing hardware components housed in the facility. In some computing infrastructure facilities, such as a colocation data center, the provider of the facility provides the building and controls the environment of the facility, but does not have access to the hardware housed in the facility. When computing hardware components (e.g., servers and storages components) housed in the facility fails, there may be multiple and varying causes including environmental causes as well as hardware wear and tear or other hardware specific causes. In some examples, some environmental conditions managed by the facility providers can result in some types of hardware failures over time. For example, higher environmental humidity may cause higher levels of disk failures and corrosion related hardware failures due to corrosion and other factors. These failures reduce the reliability and stability of systems operating in a computing infrastructure facility.

The facility providers want to minimize the conditions that can cause environmental hardware failures and also want to ensure that non-environmental hardware failures are not classified as facility provider's responsibility. However, direct monitoring by the facility provider of the hardware housed is the facility is not generally possible as the hardware components are secured by the hardware component managers or customers/business unit.

According to the system and methods described herein, the facility provider may non-invasively monitor hardware components housed in the facility. The facility provider may also determine root cause analysis of hardware faults and predict future faults using one or more machine learning models.

Figure 1:
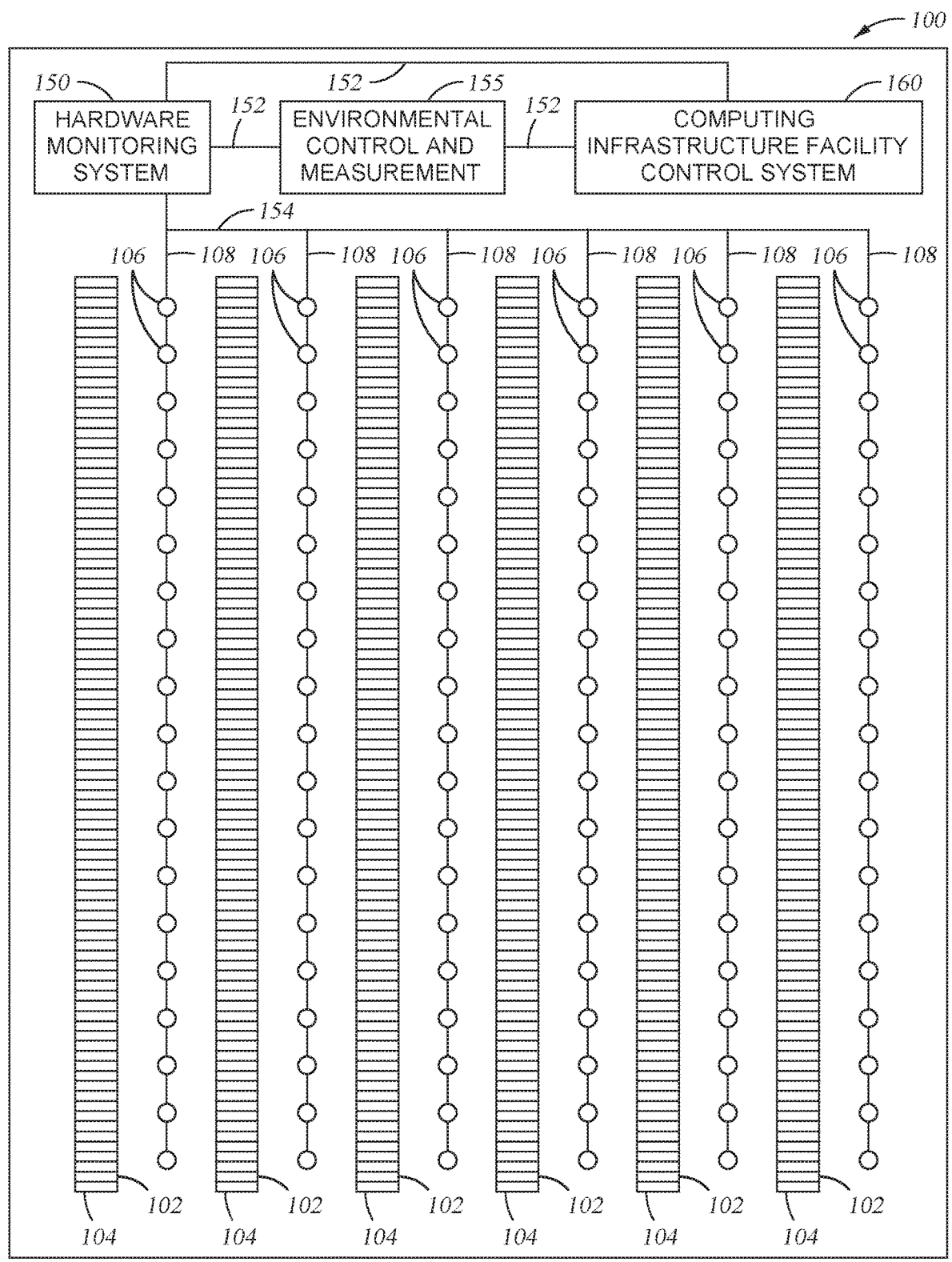
FIG. 1 depicts a computing infrastructure facility, according to one embodiment.

FIG. 1 depicts a computing infrastructure facility 100 (facility 100), according to one embodiment. As illustrated, computing infrastructure facility 100 may comprise a data center and/or a colocation data center. A colocation data center may comprise a data center facility where the managers, owners, and/or facility providers (providers) provide the facility (e.g., building/floor space, power supply, environmental control, networking bandwidth, physical security, etc.) to house computing hardware for clients, customers, and/or business units (business unit). The clients, customer, and/or business units may occupy space in the facility 100 and provide their own computing hardware for housing in the facility 100. This allows for the business unit to maintain privacy and security of the hardware and data on the hardware in the facility 100. The computing infrastructure facility 100 may include one or more computing hardware components such as computing hardware components 102, in one or more hardware rows 104. The computing hardware components 102 may include one or more servers, blade servers, rack mounted servers, computers, computer monitors, routers, switches, modems, fire protection units, power supplies, digital and physical security units, data storage units, environmental controls, and other common data center hardware components. As illustrated, the computing hardware components 102 may be organized in hardware rows 104, in other examples, the hardware rows 104 may be organized in other organizational structures such as columns, groups, aisles, etc. In one example, each hardware row 104 may be allocated to one business unit. In another example, a hardware row 104 may contain hardware from one or more business units.

The computing infrastructure facility 100 may also include a hardware monitoring system 150, an environmental control and measurement system 155, and computing infrastructure facility control system 160. The computing infrastructure facility control system 160 may include one or more hardware and software components configured to monitor and control the facility 100, including the hardware monitoring system 150, the environmental control and measurement system 155, and other hardware and software systems common to data centers such as a security, networking, and power supply systems. In some examples, the environment control and measurement system 155 may comprise a control system configured to control one or more devices to control the environment of facility 100. For example, the system 155 may control a heating, ventilation, and air conditioning (HVAC) system, fans, heat sinks, facility lighting, dehumidifiers, air filters, air flow devices, water handling and flow devices, and power and electrical systems. The system 155 may also include environmental sensors configured to measure certain properties of the environment, including a thermometer, humidity sensor, air particle sensor, etc. The sensors may be distributed around facility 100 and connected to the system 155 by a network connection.

Figure 4:
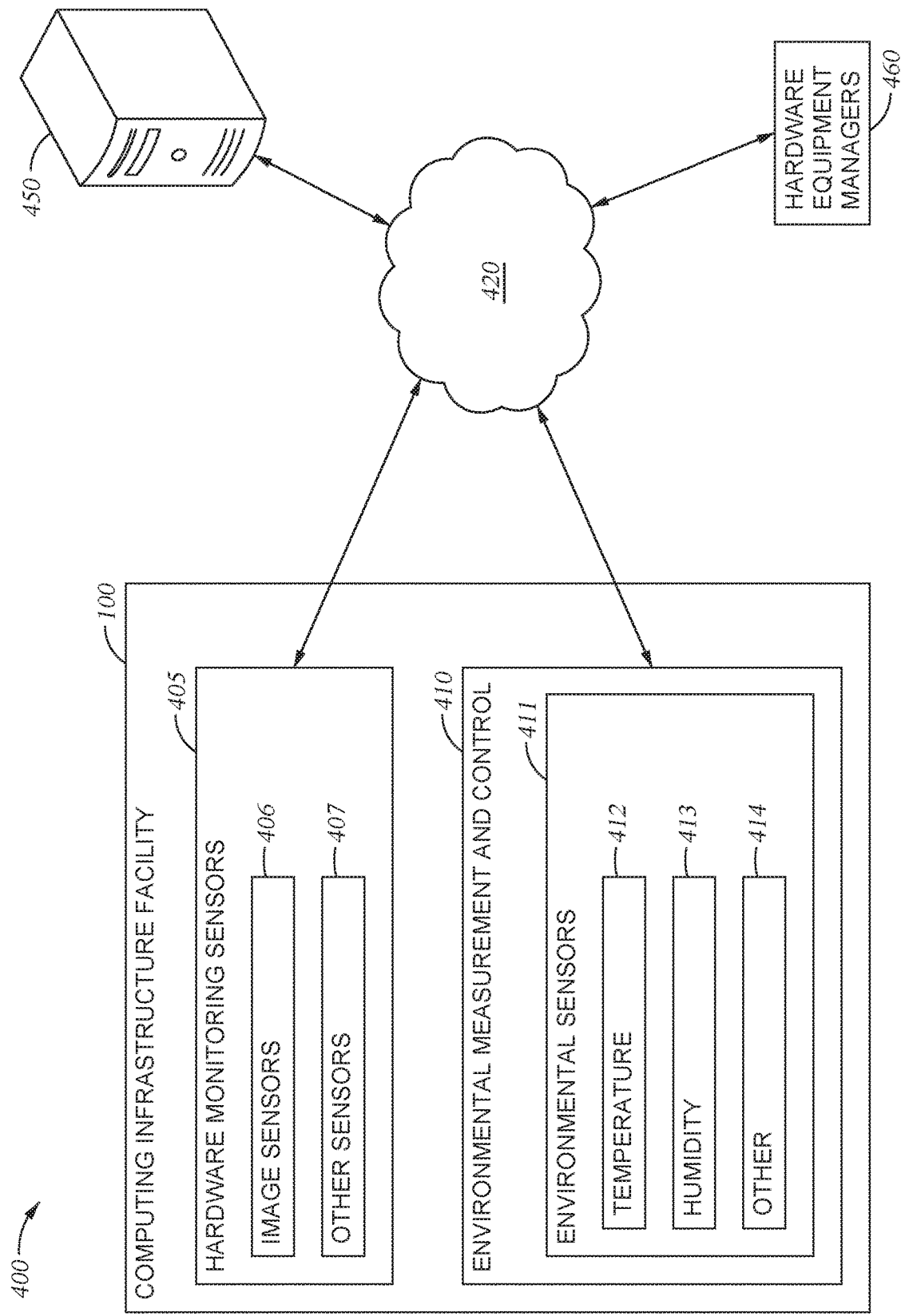
FIG. 4 illustrates an exemplary system to facilitate monitoring computing hardware in a computing infrastructure facility, according to one embodiment.
Figure 5:
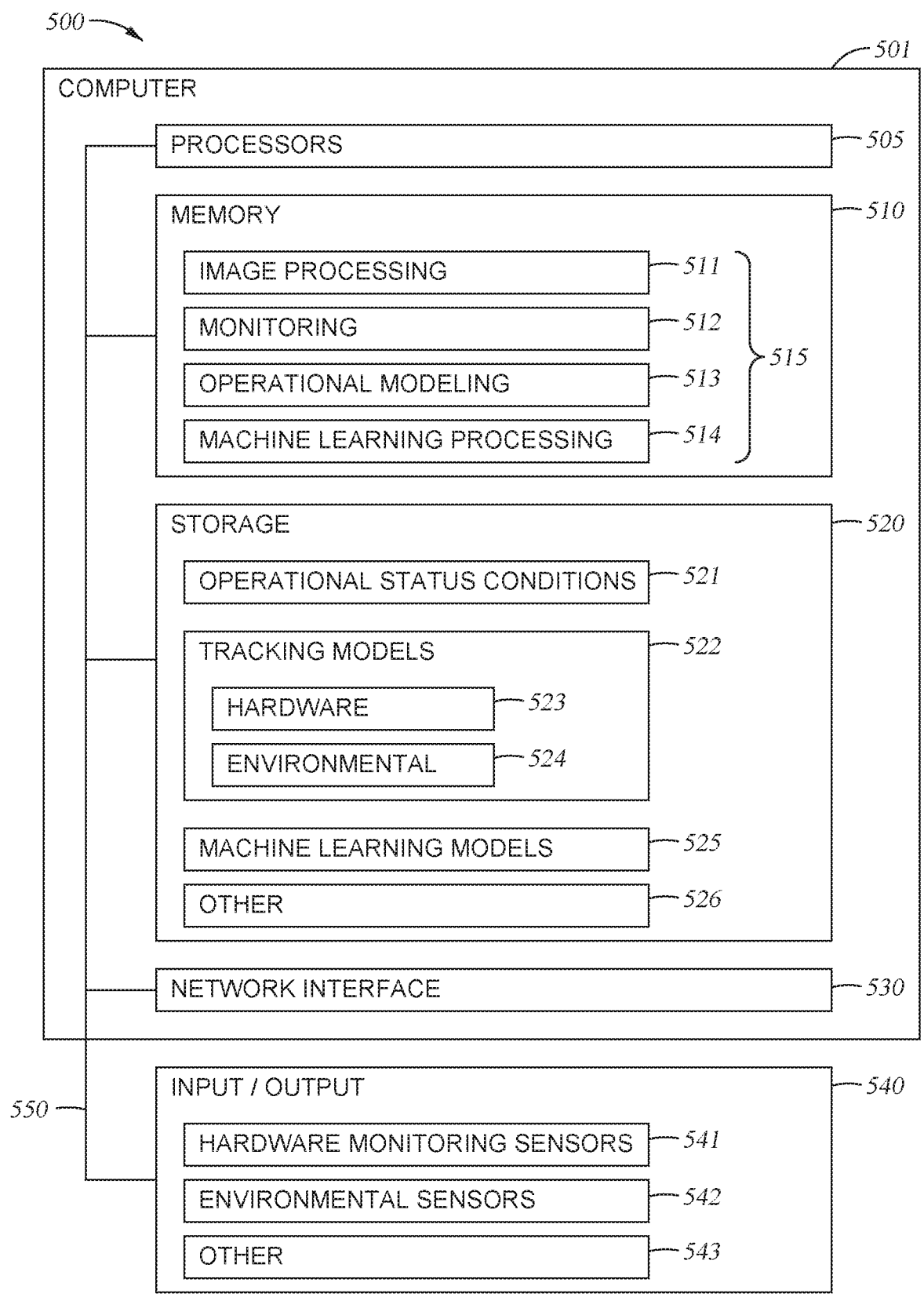
FIG. 5 is a block diagram of a server to facilitate monitoring computing hardware in a computing infrastructure facility, according to one embodiment.

In some examples, the hardware monitoring system 150, the environmental control and measurement system 155, and the computing infrastructure facility control system 160 may be collocated in a single computing entity, such as server 450 and/or computer 501 as described in relation to FIGS. 4 and 5. The computing entity may be located inside of the facility 100 or may be located remotely from the facility 100 such as in a cloud computing system. In some examples, the hardware monitoring system 150, the environmental control and measurement system 155, and the computing infrastructure facility control system 160 may comprise separate computing systems connected by a connection(s) 152. The network 152 may be a telecommunications network, a wide area network (WAN), a local area network (LAN), a wired network, a wireless network, an intranet, and/or the internet.

The computing infrastructure facility 100 may also include one or more computing hardware monitoring sensor(s) (HMS) 106 configured to receive information about the operational status of the computing hardware components 102. The HMS 106 may be configured to collect information for a single computing hardware component 102, or a plurality of computing hardware components 102. As described in more detail in relation to FIGS. 3 and 4, the HMS 106 may comprise one or more image sensors (e.g. a camera) configured to collect information from a hardware status panel of hardware component 102. In some examples, the HMS 106 are connected to the hardware monitoring system by connection(s) 154, which is similar to connection 152. In some examples, the HMS106 may be organized in one or more sensor arrays 108, where the sensor arrays 108 provide full sensor coverage of the computing hardware components 102 and of the hardware rows 104. The HMS 106 and sensor arrays 108 may be configured to continuously monitor each computing hardware component 102 in the facility 100. In another example, the HMS 106 and/or sensor arrays 108 may be configured to monitor the computing hardware components in the facility 100 according to a schedule. For example, an HMS 106 comprising a stationary camera may be configured to continuously gather image data from a select number of computing hardware components 102. In another example, an HMS 106 comprising a rotating camera may be configured to pivot among a plurality of view angles to gather data from a wider range of computing hardware components 102. While described herein in relation to image sensors and image data, the HMS 106 may include a plurality of sensors (e.g., auditory, temperature, etc.) configured to collect data which indicates the operational status of the computing hardware components 102 (e.g., audible hardware fault alerts).

Figure 2A:
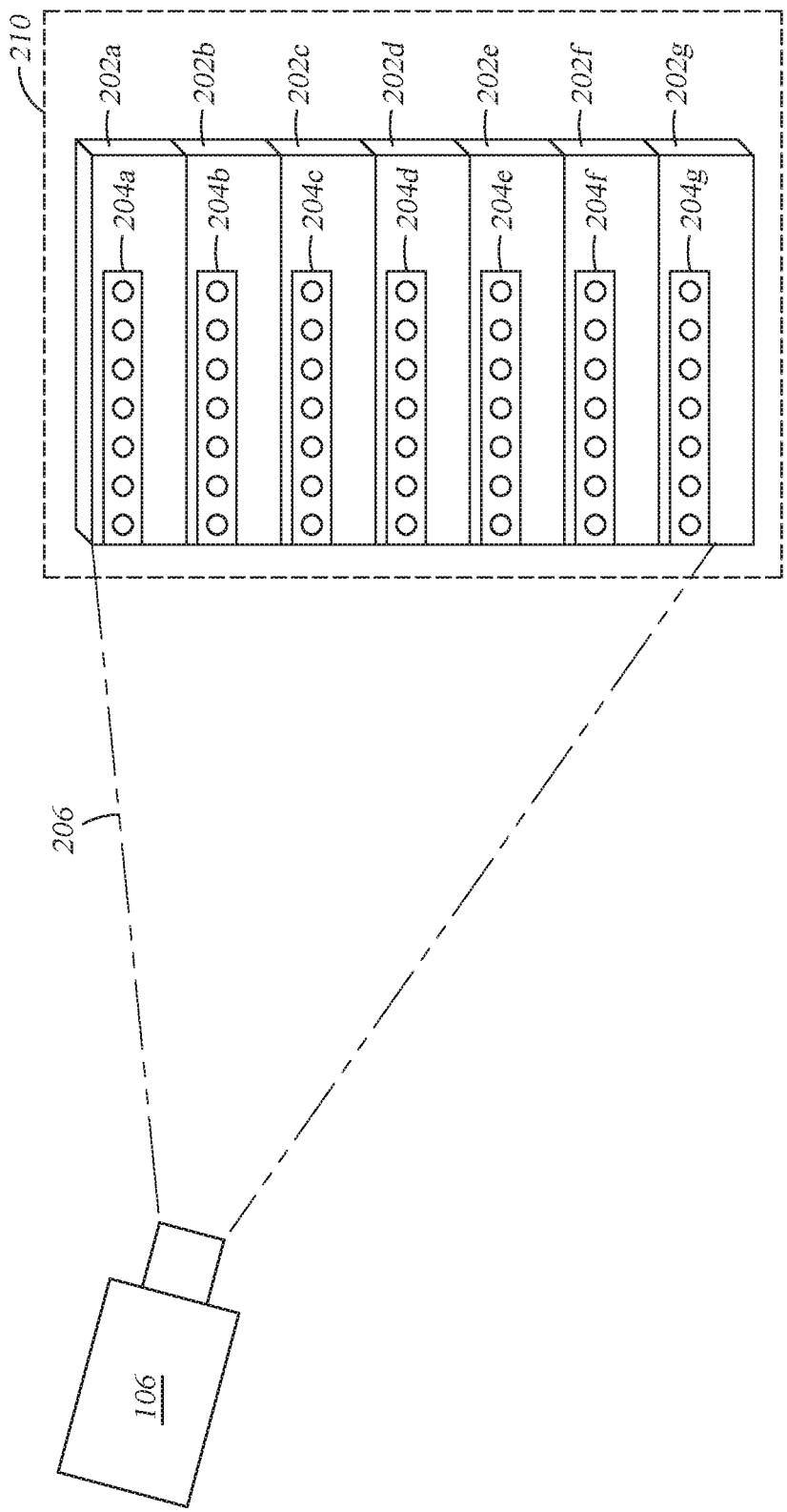
FIG. 2A illustrates a computing hardware monitoring sensor, according to one embodiment.

FIG. 2A illustrates a computing hardware monitoring sensor, according to one embodiment. The HMS 106 may comprise one or a plurality of sensors, such as an image sensor (e.g., camera). As illustrated, the HMS 106 comprises a camera configured to collect image data including one or more displays for the computing hardware components 202a-202g. As illustrated the computing hardware components may be installed in a server rack 210. Each of the computing hardware components 202a-202g comprises display such as hardware status panel 204a-204g. The HMS 106 is configured to capture the image data in the field of view (FOV) 206. In some examples, the FOV 206 includes the area capturing an image of hardware status panels 204a-204g. While illustrated as capturing a single rack; the FOV 206 may capture image data representing multiple racks and hardware components.

Figure 2B:
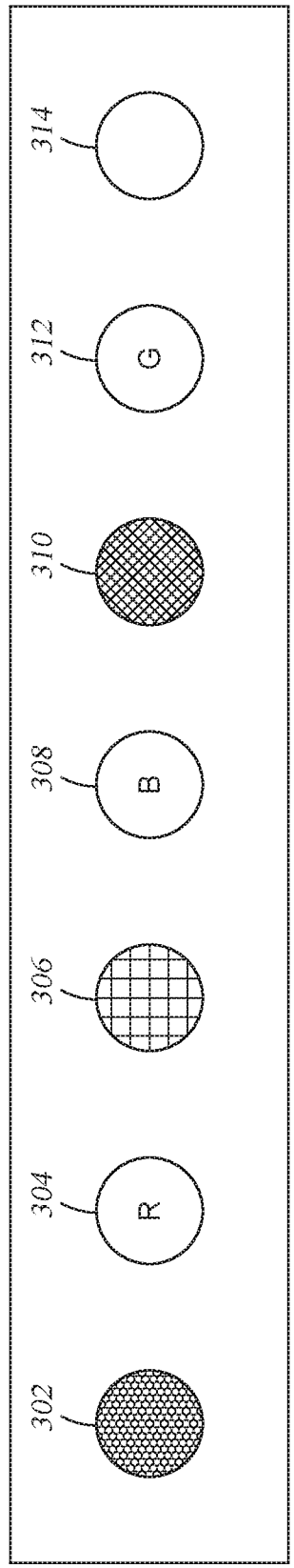
FIG. 2B illustrates a hardware status panel, according to one embodiment.

In some examples, the hardware status panels 204a-204g may comprise one or more light emitting diodes (LEDs) configured in a panel to present indications of the operational status of the computing hardware components. For example as shown in FIG. 2b, the hardware status panel 204a may include LEDs 302, 304, 306, 308, 310, 312, and 314 configured individually and together to indicate the operational status of the computing hardware component 202a shown in FIG. 2A. As illustrated in FIG. 2B, the LEDs 302-314 may be configured to illuminate multiple colors such as Red (LED 304), Blue (LED 308), and Green (LED 312). The LEDs 302-314 may also be configured to illuminate as a single color (LED 302), Flash a single color (LED 306), and/or flash multiple colors such as a combination of red, green, blue, etc. (LED 310). In some examples, an LED may not be illuminated, which may also be used to indicate the operational status of the computing hardware component 202a.

FIGS. 3A and 3B illustrate example illuminations of the hardware status panel 204a and corresponding operational statuses. FIG. 3A illustrates hardware status panels with fault conditions, according to one embodiment. The operational statuses may be organized as operational conditions set 300, including statuses 322-336. For example, as shown in operational status 322, LEDs 302-314 are all solid green colors indicating the hardware system and subsystems of the hardware component 202a are operating normally. Operational statuses 324-336 each have a unique corresponding pattern of illumination in LEDs 302-314. For example a storage fault shown by operational status 332 includes a flashing red LED 306, while LEDs 302, 304, 308, 310, 312, and 314 all illuminate as solid green. In some examples, multiple flashing LEDs may indicate multiple faults. For example, LED 304 and LED 312 both flashing red may indicate that both operational status 326 and operational status 334 are indicated, indicating hardware component 202a is experiencing a memory and power supply fault.

FIG. 3B illustrates hardware status panels with partial fault conditions, according to one embodiment. The operational statuses may be organized as operational conditions set 350, including statuses 352-366. In some examples, the operational conditions set 350 may comprise a part of operational conditions 300 and/or may be stored in the same location of the system. Similar to operational condition 322, operational condition 352 is a normal or no fault status. As shown, operational statuses 354-366 comprise unique corresponding patterns of illumination in LEDs 302-314, each pattern indicating a partial fault operational status. For example, when LED 308 is flashing blue, the hardware component 202a is experiencing a partial fault in the input/output system as shown by operational status 360. In some examples, the hardware status panel 204a and the LEDs 302-314 may indicate multiple faults, partial faults, and other operational conditions of the hardware component 202a.

In some examples, the hardware status panel 204a may comprise a different configuration from other hardware status panels such as hardware status panels 204b-204g. For example, multiple manufacturers of hardware components 202a-202g (and various hardware components 102) may implement different hardware status panels on the hardware components they manufacture. Each set of operational conditions for the various manufactures may be stored or accessed by hardware monitoring system 150 in order to provide cross platform monitoring of the hardware components in the facility 100. The operational condition sets 300 and 350 may be provided by the hardware equipment managers for the equipment the hardware equipment mangers houses in the facility 100. In some examples, the operational condition sets 300 and 350 may comprise standard operational condition sets available from the manufacturer of the hardware components 102.

FIG. 4 illustrates an exemplary system 400 to facilitate monitoring computing hardware in a computing infrastructure facility 100, according to one embodiment. As illustrated and shown in FIG. 1 and FIG. 6, the system 400 may include various components within the facility 100. The system 400 may also include components that are outside the facility 100. For example, a server 450 may be located remotely from the facility 100, such as in a cloud computing system or a at a central control center.

Components within the facility 100 include one or more hardware monitoring sensors 405 including visual sensors 406. The sensors 405 may also include other sensors 407 capable of providing meaningful information about the operational status of the hardware components, such as audible sensors. The sensors 405 may be discrete sensor devices, such as HMS 106 shown in FIG. 1, distributed throughout the facility 100 in fixed and/or movable locations. In some examples, the sensors 405 may be arranged in groups or arrays, such as sensor array 108. Sensors 405 may be in fixed locations such as included in the walls, floors, ceilings, and other structures of the facility 100. In one embodiment, sensors 405 may include adjustable-position sensor devices, such as motorized cameras (i.e., an example of visual sensors 406). In one embodiment, sensors 405 may be included on one or more unmanned vehicles configured to travel through the facility 100, such as unmanned ground vehicles (UGVs) or unmanned aerial vehicles (UAVs or "drones"). Sensors 405 may also include sensor devices that are included in computing devices associated with the facility 100, such as mobile devices carried by employees of the facility 100.

Also within the facility 100 include one or more components of an environmental measurement and control system 410 including environmental sensors 411. The sensors 411 may include temperature sensor 412, humidity sensor 413 and may also include other sensors 414 capable of providing meaningful information about the environmental conditions of the facility 100, such as particle sensors. The sensors 411, like sensors 405 may be discrete sensor devices, distributed throughout the facility 100 in fixed and/or movable locations. The sensors may also be incorporated in environmental control devices in the facility 100, such as incorporate as part of an (HVAC) system, fans, heat sinks, facility lighting, dehumidifiers, air filters, air flow devices, water handling and flow devices. Sensors 411 may also be in fixed locations such as included in the walls, floors, ceilings, and other structures of the facility 100. In one embodiment, sensors 411 may also be included on one or more unmanned vehicles configured to travel through the facility 100, such as UGVs or UAVs. Sensors 411 may also include sensor devices that are included in computing devices associated with the facility 100, such as mobile devices carried by employees of the facility 100.

Server 450 generally includes processor(s), memory, and communications capabilities and is configured to perform various computing tasks to support the management and operation of the facility 100. Server 450 may communicate using various wired and/or wireless communications methods with sensors 405, and with other networked devices. Server 450 generally executes computer program code in which input data is received from the networked devices, the input data is processed and/or stored by the servers, and output data is provided to networked devices for management and operation of the facility 100. In some examples, the hardware monitoring system 150, the environmental control and measurement system 155, and the computing infrastructure facility control system 160 described in relation to FIG. 1 may all be located on and/or executed by the server 450.

Hardware equipment managers interface 460 comprises an interface between the facility 100 and the owner(s) of the hardware components housed in the facility 100. As described above, the hardware equipment managers control the digital access to the hardware components (e.g. hardware components 102) in the facility. In some examples, the hardware equipment interface 460 is configured to provide operational conditions of the hardware components 102 to the server 450. In some examples, the interface 460 may provide the operational conditions sets 300 and 350 described in relation to FIG. 3.

Network 420 may include one or more networks of various types, including a local area or local access network (LAN), a general wide area network (WAN), and/or a public network (e.g., the Internet). In one embodiment, various networked computing devices of the system 400 are interconnected using a LAN, and one or more computing devices (e.g., server 450, hardware equipment managers 460, etc.) include connections to the Internet.

FIG. 5 is a block diagram of a server, such as server 450, to facilitate monitoring computing hardware in the computing infrastructure facility 100, according to one embodiment. As shown in FIG. 5, the arrangement 500 may include the server 450 embodied as computer 501 configured to execute the function of the system 150. The computer 501 is shown in the form of a general-purpose computing device. The components of computer 501 may include, but are not limited to, one or more processors or processing units 505, a system memory 510, a storage system 520, network interface 530, and a bus 550 that couples various system components including the system memory 510 and storage system 520 to processors 505 along with various input/output components 540. In other embodiments, arrangement 500 is distributed and includes a plurality of discrete computing devices that are connected through wired or wireless networking.

Bus 550 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer 501 typically includes a variety of computer system readable media. Such media may be any available media that is accessible by computer 501, and it includes both volatile and non-volatile media, removable and non-removable media.

System memory 510 can include computer system readable media in the form of volatile memory, such as random access memory (RAM) and/or cache memory. Computer 501 may further include other removable/non-removable, volatile/non-volatile computer system storage media. By way of example, storage system 520 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 550 by one or more data media interfaces. As will be further depicted and described below, memory 510 may include at least one program product having a set (e.g., at least one) of program modules that are configured to carry out the functions of embodiments of the invention.

Computer 501 may further include other removable/non-removable, volatile/non-volatile computer system storage media. In some examples storage system 520 may be included as part of memory 510 and may typically provide a non-volatile memory for the networked computing devices, and may include one or more different storage elements such as Flash memory, a hard disk drive, a solid state drive, an optical storage device, and/or a magnetic storage device. For example, storage system 520 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 550 by one or more data media interfaces. Storage 520 may include media for storing operational conditions 521, including operational condition sets 300 and 350. The storage system 520 may also include tracking models 522, which can include data representing the hardware tracking models 523 and environmental tracking models 525, which may be updated and accessed by the program modules 515 described herein, including the operational modeling module 513 and the machine learning processing module 514. The storage system 520 may also include machine learning models 525, which may include the parameters and outputs used in the machine learning processes described herein, such as by the machine learning processing module 514. Storage system 520 may also include other information 526 stored for access and use by the computer 501.

Memory 510 may include a plurality of modules 515 for performing various functions described herein. The modules 515 generally include program code that is executable by one or more of the processors 505. As shown, modules 515 include image processing module 511, image processing module 511, and Monitoring module 512, operational modeling module 513, and machine learning processing module 514.

The modules 515 may also interact with each other and storage system 520 to perform certain functions. For example, the image processing module 511 may be configured to receiving, from one or more sensors, such as hardware monitoring sensors 541, image data captured using one or more camera devices and representing output of one or more displays for a one or more computing hardware components. The image data may include image data as described in relation to FIGS. 2A, 2B, 3A, and 3B, such image data including a hardware status panel comprising LEDs. In some examples, the image data representing the operational status of the one or more computing hardware components comprises image data of a lighted panel arrangement, such as hardware status panel 204a in FIGS. 2A and 2B, associated with the one or more computing hardware components, such as hardware component 202a, where the lighted panel arrangement (hardware status panel 204a) comprises one or more lights (LEDs 302-314) configured to emit one or more patterns of light, wherein the one or more patterns of light represent one or more operational statuses of the one or more associated computing hardware components.

The image processing module 511 may also be configured in conjunction with operation status conditions 521 to determine, from the received image data, a current operational status for a computing hardware component of the one or more computing hardware components. For example, the image processing module 511 may compare the image data representing the operational status to a set of predefined operational status conditions, such as comparing the received image data to the operational conditions set 300 stored in operation status conditions 521, and determining that the hardware status panel 204a indicates that hardware component 202a is functioning normally, when LEDs 302-314 are all illuminated green, as shown in operational status 322.

In some embodiments, the monitoring module 512 may be configured to determine from the comparison of the image data to the set of predefined operational status conditions that the current operational status is a fault status. For example, if the comparison indicates the operational status 334, the monitoring module 512 determines that the operational status is a fault status. The monitoring module 512 may then generate an alert representing the current operational status as a fault status and transmit the alert to a control system, such as system 160. In some examples, the alert may also be transmitted to hardware equipment managers 460 for further analysis.

Monitoring module 512 may also be configured to receive, from one or more sensors 542, environmental data representing environmental conditions of the computing infrastructure facility 100. The environmental data may include humidity, particle concentration, temperature, etc.

In some embodiments, operational modeling module 513 may be configured to update a hardware operational status tracking model, such as hardware tracking model 523, for the computing hardware component. Operational modeling module 513 may also be configured to update an environment tracking model, such as environmental tracking model 524 for the computing infrastructure facility 100 with the environmental conditions.

In some example embodiments, machine learning processing module 514 may be configured to train and learn from machine learning model and perform a root cause analysis for a fault status by processing a hardware operational status tracking model, (e.g., model 523) and the environment tracking model (e.g., model 524) through a machine learning model, such as machine learning model stored in machine learning models 525, to first to build and/or train an analytical machine learning model and perform root cause analysis of a fault status and predict future fault statuses. The machine learning processing module 514 may also determine that the fault status is an environmental fault status when the environmental tracking model contains related environmental conditions for causing the fault status and/or determine that the fault status is not an environmental fault status when the environmental tracking model does not contain related environmental conditions for causing the fault status. In some examples, the machine learning model may comprise a supervised learning model. In some examples, machine learning processing module 514 further utilize the determination of whether the fault status is an environmental fault status or not an environmental fault status to further train or update the supervised learning model in order for future environmental fault statuses to be determined or predicted based on the supervised learning model.

Computer 501 may also communicate with one or more external devices such as a keyboard, a pointing device, a display, etc.; and one or more devices that enable a user to such as interact with computer 501; and/or any devices (e.g., network card, modem, etc.) that enable computer 501 to communicate with one or more other computing devices. Such communication can occur via I/O interface 540. Additionally, computer 501 may communicate with one or more networks such as a local area network (LAN), a general wide area network (WAN), and/or a public network (e.g., the Internet) via network interface 530. Computer 501 may also communicate hardware equipment mangers 460 and machine learning systems through network interface 530. For example, the machine learning models, described herein, may be built out through various modeling methods such as support vector machines, clustering (computer vision models), neural networks, deep learning, and/or other ensemble methods that may improve the accuracy of prediction from the model. As depicted, network interface 530 communicates with the other components of computer 501 via bus 550. It should be understood that although not shown, other hardware and/or software components could be used in conjunction with computer 501. Examples, include, but are not limited to: cloud computing systems, microcode, device drivers, redundant processing units, external disk drive arrays, RAID systems, tape drives, and data archival storage systems, etc.

In some examples, I/O interface 540 hardware monitoring sensors 541, environmental sensors 542, which may encompass the various sensors 405 and 411 depicted in FIG. 4. Sensors 541 and 542 may be subdivided into worn (or carried) sensors that are worn or carried by persons within the facility 100, and distributed sensors that are disposed at fixed or movable locations within the environment, such as sensor arrays 108.

Figure 6:
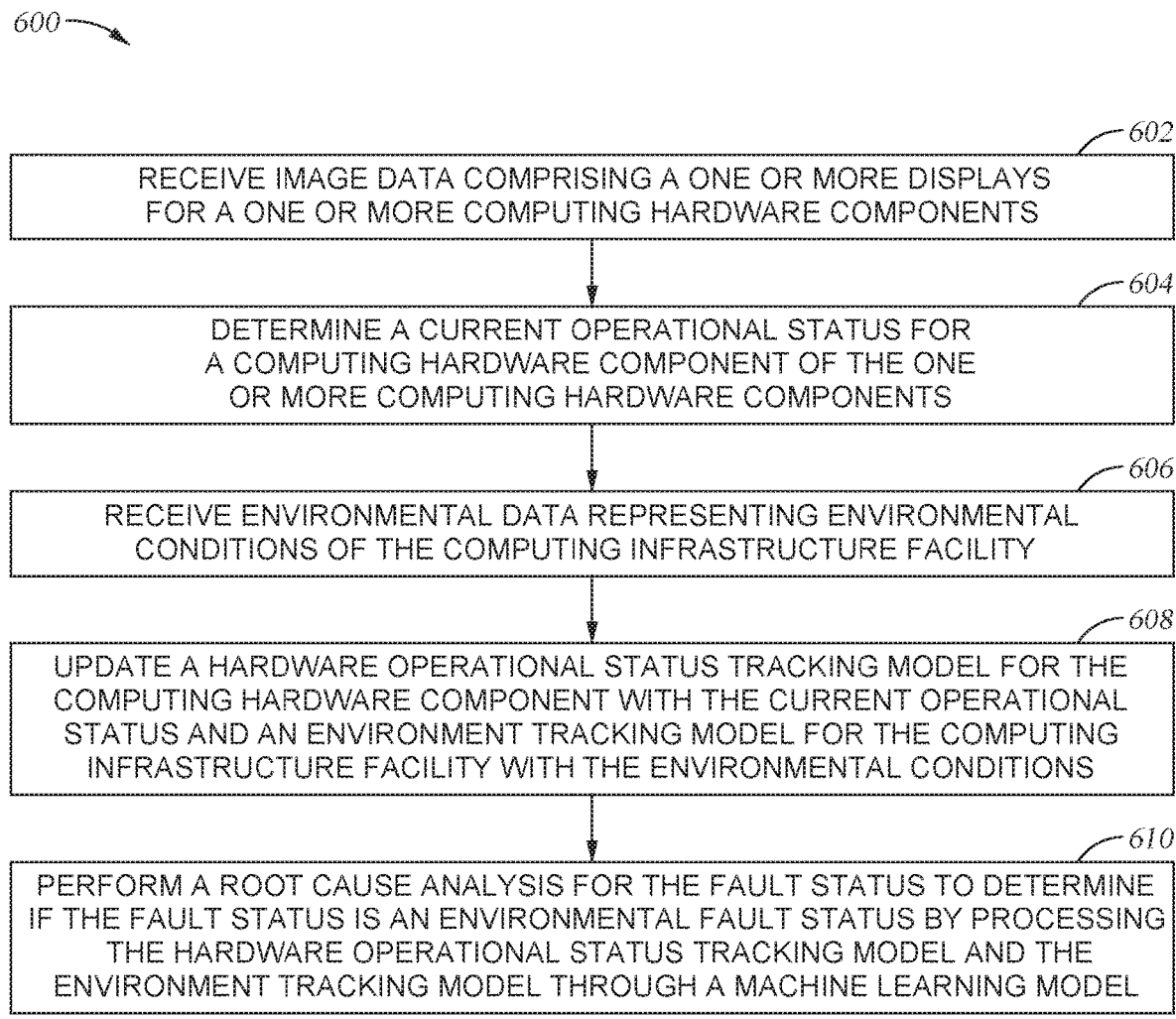
FIG. 6 illustrates a method to monitor computing hardware in a computing infrastructure facility, according to one embodiment.

FIG. 6 illustrates a method to monitor computing hardware in a computing infrastructure facility, according to one embodiment. Method 600 begins at block 602, where image data is received into the hardware monitoring system 150. For example, system 150 including image processing module 511 receiving image data captured using one or more camera devices and representing output of one or more displays for a one or more computing hardware components. For example, the image data may be received from one or more sensors, e.g., HMS 106, and include displays of the one or more computing hardware components 202a-202g. In some examples, the image data comprises image data of a lighted panel arrangement associated with the one or more computing hardware components, wherein the lighted panel arrangement comprises one or more lights configured to emit one or more patterns of light, wherein the one or more patterns of light represent one or more operational statuses of the one or more associated computing hardware components, as described in relation to FIGS. 2A-3B.

At block 604, system 150 including the image processing module 511 may then determine, from the received image data, a current operational status for a computing hardware component of the one or more computing hardware components. For example, the image processing module 511 in conjunction with a stored operational conditions set 300 may determine that the operational status is operational status 358 indicating that the hardware component 202a has a cooling subsystem partial fault.

At block 606, the system 150 including the monitoring module 512 receives, from one or more sensors, environmental data representing environmental conditions of the computing infrastructure facility. At block 608, system 150 including the operational modeling module 513, may update a hardware operational status tracking model for the computing hardware component with the current operational status and an environment tracking model for the computing infrastructure facility with the environmental conditions. For example, the module 513 may update the hardware model 523 with a fault status or a normal status based on the determination in block 604 and may update the environmental model 524 with a received humidity and temperature measurement.

At block 610, the system 150 including machine learning processing module 514 processes is configured to perform a root cause analysis for the fault status to determine if the fault status is an environmental fault status by processing the hardware operational status tracking model, such as hardware model 523 and the environment tracking model, such as environmental model 524, through a machine learning model, such as machine learning models 525.

Figure 7:
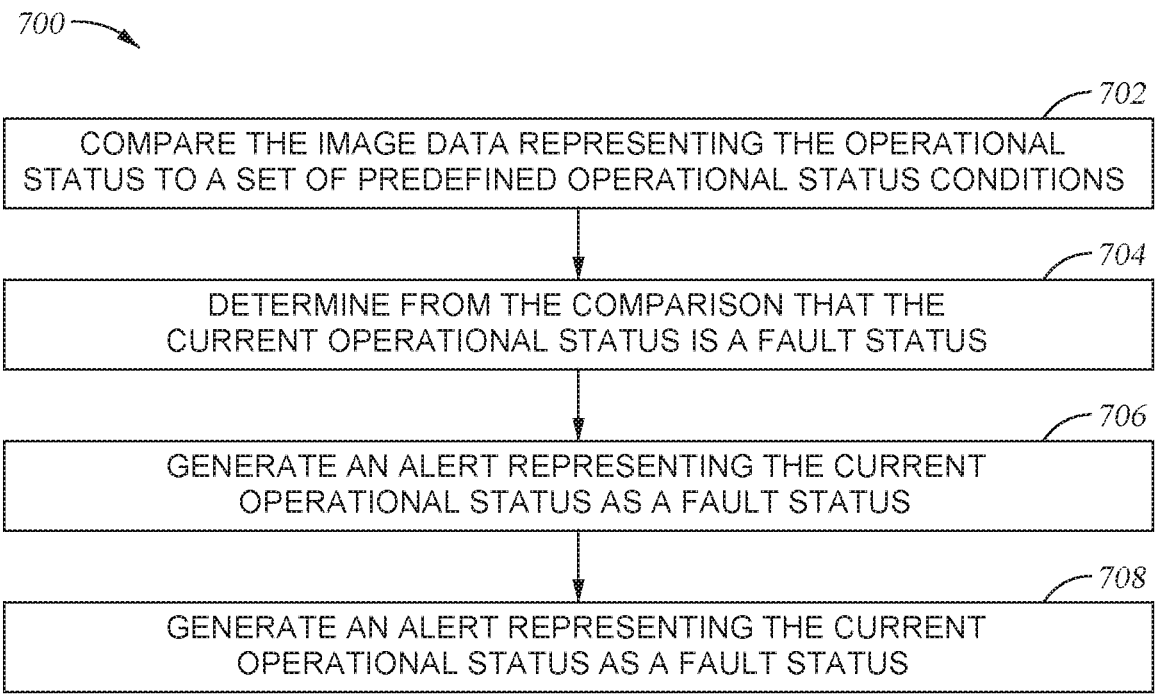
FIG. 7 illustrates a method to determine a current operational status for a computing hardware, according to one embodiment.

FIG. 7 illustrates a method to determine a current operational status for a computing hardware, according to one embodiment. Method 700 begins at block 702, where the system 150 including the image processing module 511 compares the image data representing the operational status to a set of predefined operational status conditions. In some examples, block 702 may comprise an example of determining the current operational status for a computing hardware component, as described in relation to FIG. 6.

At block 704, the system 150 including monitoring module 512, determines from the comparison that the current operational status is a fault status. At block 706, the system 150 including monitoring module 512, generates an alert representing the current operational status as a fault status. In some examples, the alert may comprise an indication that the system has a fault. In some examples, the alert may be configured to be sent to a third party such as a hardware equipment manager, such as through hardware equipment managers interface 460. At block 708, the system 150 including monitoring module 512, transmits the alert to a control system, such as system 160. The alert may also be transmitted to a hardware equipment manager.

Figure 8:
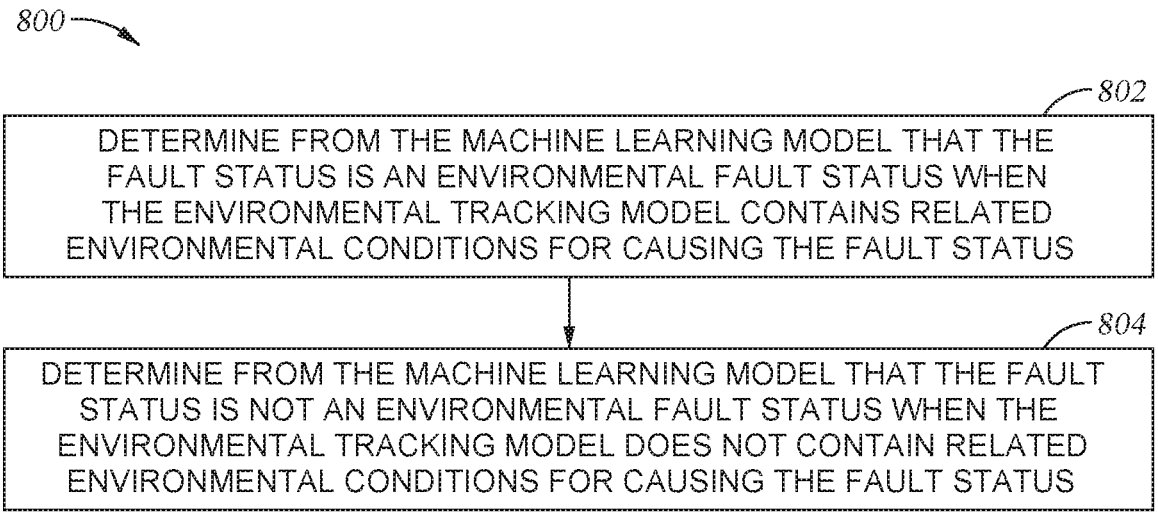
FIG. 8 illustrates a method to perform a root cause analysis for a fault status, according to one embodiment.

FIG. 8 illustrates a method to perform a root cause analysis for a fault status, according to one embodiment. Method 800 begins at block 802 the system 150, including machine learning processing module 514, determines from the machine learning model that the fault status is an environmental fault status when the environmental tracking model contains related environmental conditions for causing the fault status. At block 804, the system 150, including machine learning processing module 514, determines from the machine learning model that the fault status is not an environmental fault status when the environmental tracking model does not contain related environmental conditions for causing the fault status. In some examples, the determination of whether the fault status is an environmental fault status or not an environmental fault status is further used to train or update the machine learning model in order for future environmental fault statuses to be determined.

Figure 9:
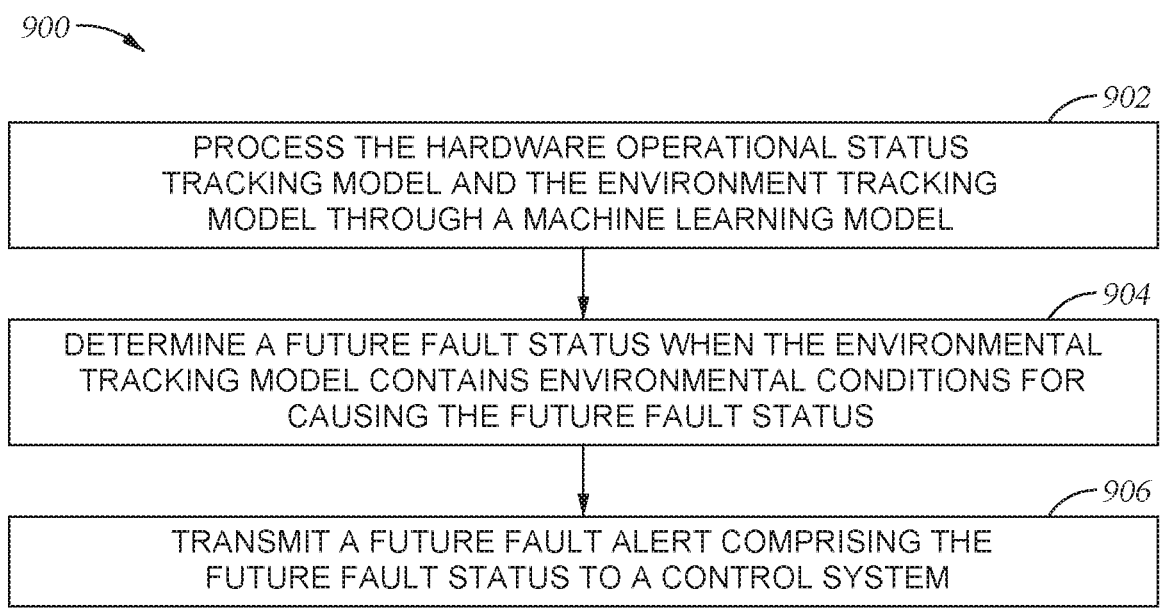
FIG. 9 illustrates a method to perform a future fault analysis, according to one embodiment.

FIG. 9 illustrates a method to perform a future fault analysis, e.g. predict future environmental fault status, according to one embodiment. Method 9 begins at block 902 where the system 150 including machine learning processing module 514 processes the hardware operational status tracking model and the environment tracking model through a machine learning model. In some examples, the machine learning model may comprise a supervised learning model that has been trained according to previous determinations of environmental fault conditions.

At block 904, the system 150, including machine learning processing module 514, determines a future fault status when the environmental tracking model, such as the trained supervised learning model, contains environmental conditions for causing the future fault status. At block 906, the system 150, including monitoring module 512, transmits a future fault alert comprising the future fault status to a control system. The future fault alert may also be transmitted to a hardware equipment manager, through the hardware equipment mangers interface 460.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications such as a system 150 or related data available in the cloud. For example, the system 150 could execute on a computing system in the cloud. Doing so allows a user to access relevant information and execute the functions of the system 150 from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method for monitoring computing hardware in a computing infrastructure facility, the method comprising:
   receiving, at a non-invasive hardware monitoring system associated with the computing infrastructure facility, image data captured using one or more camera devices and representing output of one or more displays for a plurality of secured computing hardware components, wherein the plurality of secured computing hardware components comprises at least two types of hardware platform configurations, and wherein the non-invasive hardware monitoring system is communicatively independent from the one or more secured computing hardware components;
   determining, from the received image data, a current operational status for a computing hardware component of the plurality of secured computing hardware components, based on the output of a display of the computer hardware component and operational information for a hardware platform configuration of the computing hardware component;
   receiving, from one or more sensors, environmental data representing environmental conditions of the computing infrastructure facility;
   updating a hardware operational status tracking model for the computing hardware component with the current operational status and an environment tracking model for the computing infrastructure facility with the environmental conditions; and
   when the current operational status for a computing hardware component comprises a fault status, performing a root cause analysis to determine if the fault status is an environmental fault status by processing the hardware operational status tracking model and the environment tracking model through a machine learning model.

2. The method of claim 1, wherein determining the current operational status for a computing hardware component further comprises:
   comparing the image data representing the operational status to a set of predefined operational status conditions.

3. The method of claim 2, further comprising:
   determining from the comparison of the image data that the current operational status is a fault status;
   generating an alert representing the current operational status as a fault status; and
   transmitting the alert to a control system.

4. The method of claim 1, further comprising:
   wherein the machine learning model comprises a supervised learning model.

5. The method of claim 1, wherein the method further comprises:
   determining from the machine learning model that the fault status is an environmental fault status when the environmental tracking model contains related environmental conditions for causing the fault status; and
   determining from the machine learning model that the fault status is not an environmental fault status when the environmental tracking model does not contain related environmental conditions for causing the fault status.

6. The method of claim 1, further comprising:
   performing a future fault analysis by:
      processing the hardware operational status tracking model and the environment tracking model through the machine learning model; and
      determining a future fault status will occur when the environmental tracking model contains environmental conditions for causing the future fault status; and
   transmitting a future fault alert comprising the future fault status to a control system.

7. The method of claim 1, wherein the image data comprises image data of a lighted panel arrangement associated with the one or more computing hardware components, wherein the lighted panel arrangement comprises one or more lights configured to emit one or more patterns of light, wherein the one or more patterns of light represent one or more operational statuses of the one or more associated computing hardware components.

8. A non-invasive hardware monitoring system for monitoring computing hardware in a computing infrastructure facility, the system comprising:
   one or more computer processors;
   one or more sensors;
   one or more camera devices; and
   a memory containing a program which when executed by the processors performs an operation comprising:
      receiving, at the non-invasive hardware monitoring system associated with the computing infrastructure facility, image data captured using the one or more camera devices and representing output of one or more displays for a plurality of secured computing hardware components, wherein the plurality of secured computing hardware components comprises at least two types of hardware platform configurations, and wherein the non-invasive hardware monitoring system is communicatively independent from the one or more secured computing hardware components;

determining, from the received image data, a current operational status for a computing hardware component of the plurality of secured computing hardware components, based on the output of a display of the computer hardware component and operational information for a hardware platform configuration of the computing hardware component;

receiving, from the one or more sensors, environmental data representing environmental conditions of the computing infrastructure facility;

updating a hardware operational status tracking model for the computing hardware component with the current operational status and an environment tracking model for the computing infrastructure facility with the environmental conditions; and when the current operational status for a computing hardware component comprises a fault status, performing a root cause analysis to determine if the fault status is an environmental fault status by processing the hardware operational status tracking model and the environment tracking model through a machine learning model.

9. The system of claim 8, wherein determining the current operational status for a computing hardware component further comprises:

comparing the image data representing the operational status to a set of predefined operational status conditions.

10. The system of claim 9, wherein the operation further comprises:

determining from the comparison of the image data that the current operational status is a fault status;

generating an alert representing the current operational status as a fault status; and transmitting the alert to a control system.

11. The system of claim 8, wherein the machine learning model comprises a supervised learning model.

12. The system of claim 8, wherein the operation further comprises:

determining from the machine learning model that the fault status is an environmental fault status when the environmental tracking model contains related environmental conditions for causing the fault status; and determining from the machine learning model that the fault status is not an environmental fault status when the environmental tracking model does not contain related environmental conditions for causing the fault status.

13. The system of claim 8, wherein the operation further comprises:

performing a future fault analysis by:

processing the hardware operational status tracking model and the environment tracking model through the machine learning model; and determining a future fault status will occur when the environmental tracking model contains environmental conditions for causing the future fault status; and transmitting a future fault alert comprising the future fault status to a control system.

14. The system of claim 8, wherein the image data comprises image data of a lighted panel arrangement associated with the one or more computing hardware components, wherein the lighted panel arrangement comprises one or more lights configured to emit one or more patterns of light, wherein the one or more patterns of light represent one or more operational statuses of the one or more associated computing hardware components.

15. A computer program product for monitoring computing hardware in a computing infrastructure facility, the computer program product comprising:

a computer-readable storage medium having computer-readable program code embodied therewith, the computer-readable program code executable by one or more computer processors to perform an operation that includes:

receiving, at a non-invasive hardware monitoring system associated with the computing infrastructure facility, image data captured using one or more camera devices and representing output of one or more displays for a plurality of secured computing hardware components, wherein the plurality of secured computing hardware components comprises at least two types of hardware platform configurations, and wherein the non-invasive hardware monitoring system is communicatively independent from the one or more secured computing hardware components;

determining, from the received image data, a current operational status for a computing hardware component of the plurality of secured computing hardware components, based on the output of a display of the computer hardware component and operational information for a hardware platform configuration of the computing hardware component;

receiving, from one or more sensors, environmental data representing environmental conditions of the computing infrastructure facility;

updating a hardware operational status tracking model for the computing hardware component with the current operational status and an environment tracking model for the computing infrastructure facility with the environmental conditions; and when the current operational status for a computing hardware component comprises a fault status, performing a root cause analysis to determine if the fault status is an environmental fault status by processing the hardware operational status tracking model and the environment tracking model through a machine learning model.

16. The computer program product of claim 15, wherein the operation further includes:

comparing the image data representing the operational status to a set of predefined operational status conditions;

determining from the comparison of the image data that the current operational status is a fault status;

generating an alert representing the current operational status as a fault status; and transmitting the alert to a control system.

17. The computer program product of claim 15, wherein the machine learning model comprises a supervised learning model.

18. The computer program product of claim 15, wherein the operation further comprises:

determining from the machine learning model that the fault status is an environmental fault status when the environmental tracking model contains related environmental conditions for causing the fault status; and determining from the machine learning model that the fault status is not an environmental fault status when the environmental tracking model does not contain related environmental conditions for causing the fault status.

19. The computer program product of claim 15, wherein the operation further includes:
performing a future fault analysis by:
processing the hardware operational status tracking model and the environment tracking model through the machine learning model; and
determining a future fault status will occur when the environmental tracking model contains environmental conditions for causing the future fault status; and
transmitting a future fault alert comprising the future fault status to a control system.

20. The computer program product of claim 15, wherein the image data representing an operational status of the one or more computing hardware components comprises image data of a lighted panel arrangement associated with the one or more computing hardware components, wherein the lighted panel arrangement comprises one or more lights configured to emit one or more patterns of light, wherein the one or more patterns of light represent one or more operational statuses of the one or more associated computing hardware components.

\* \* \* \* \*